United States Patent [19]
Moen

[11] 3,782,417
[45] Jan. 1, 1974

[54] FAUCET CONSTRUCTION

[76] Inventor: Alfred M. Moen, 25 Lakeview Dr., Grafton, Ohio 44044

[22] Filed: June 22, 1972

[21] Appl. No.: 265,278

Related U.S. Application Data

[63] Continuation-in-part of Ser. No. 147,327, May 27, 1971.

[52] U.S. Cl............................ 137/625.17, 137/359
[51] Int. Cl............................................. F16k 11/02
[58] Field of Search.................... 137/625.17, 636.4, 137/359, 360; 251/368

[56] References Cited
UNITED STATES PATENTS

| | | | |
|---|---|---|---|
| 3,204,656 | 9/1965 | Moen............................ | 137/625.17 X |
| 3,561,485 | 2/1971 | Klingler......................... | 137/625.17 |
| 3,550,902 | 12/1970 | Pidgeon......................... | 251/368 X |
| 3,387,631 | 6/1968 | Pecis............................. | 137/625.17 |
| 3,554,232 | 1/1971 | Kappel et al.................... | 137/625.17 |
| 3,202,181 | 8/1965 | West............................. | 137/625.17 |
| 3,415,280 | 12/1968 | Bucknell et al................. | 137/625.17 |
| 3,443,266 | 5/1969 | Mongerson et al............. | 137/359 X |
| 3,506,036 | 4/1970 | Hare............................. | 137/636.3 |
| 3,661,181 | 5/1972 | Palmer et al................... | 137/625.17 |

Primary Examiner—William R. Cline
Attorney—Howard T. Markey et al.

[57] ABSTRACT

A single lever mixing faucet has a stem rotatable and reciprocal relative to a surrounding sleeve. The stem and sleeve are positioned within a receiver and are pressure balanced by means of an air passage extending through the stem and connecting the interior space between the stem and the sleeve with atmosphere. The seals between the stem and receiver have portions in sealing contact with the stem, sleeve and receiver and cooperate with the interior surface of the receiver to define water passages between the receiver inlets and the sleeve inlets. The receiver and valve are supported on a body member and there are means to connect the receiver to the body member and to interlock the conduits within the body member to the receiver and to the body member.

25 Claims, 16 Drawing Figures

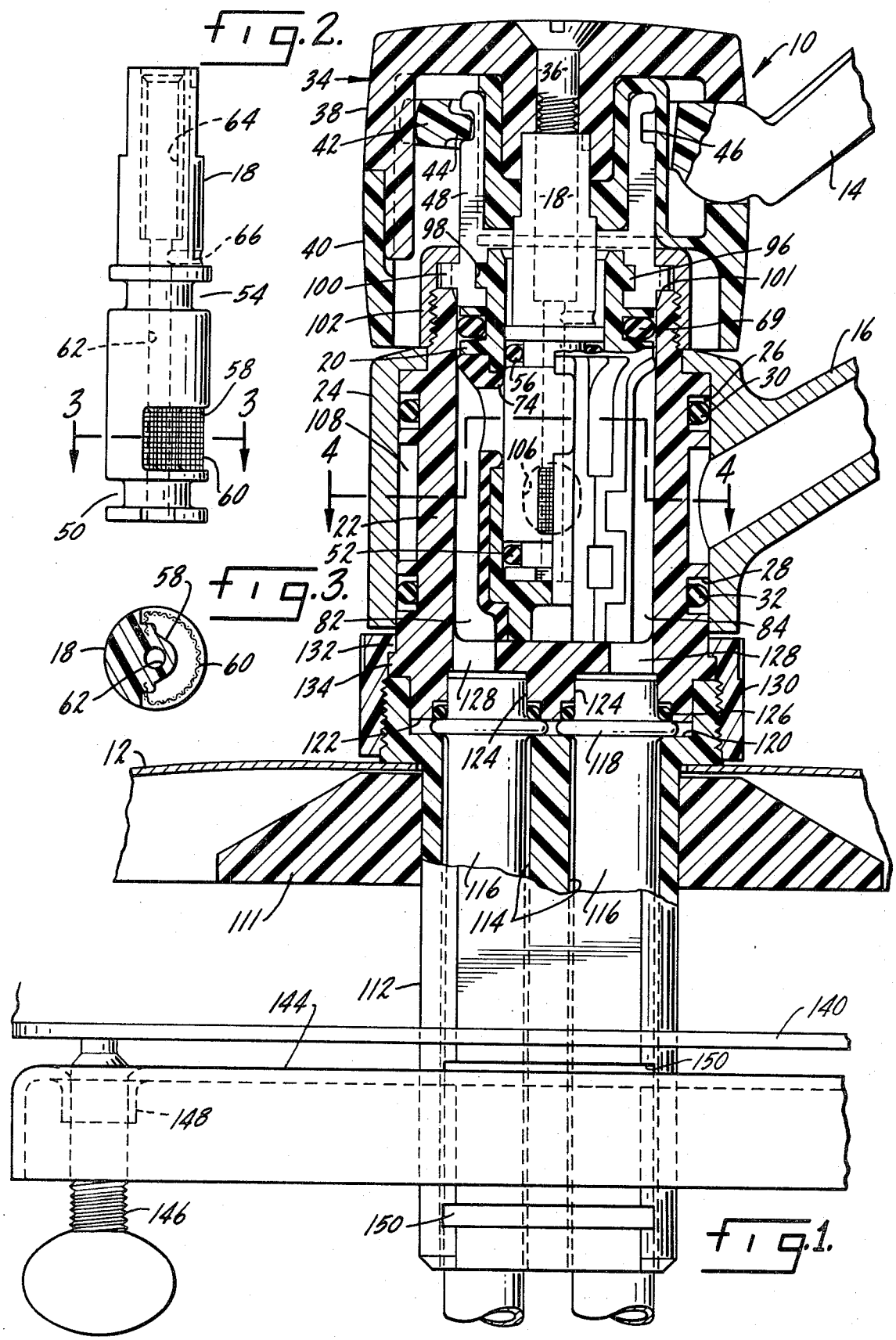

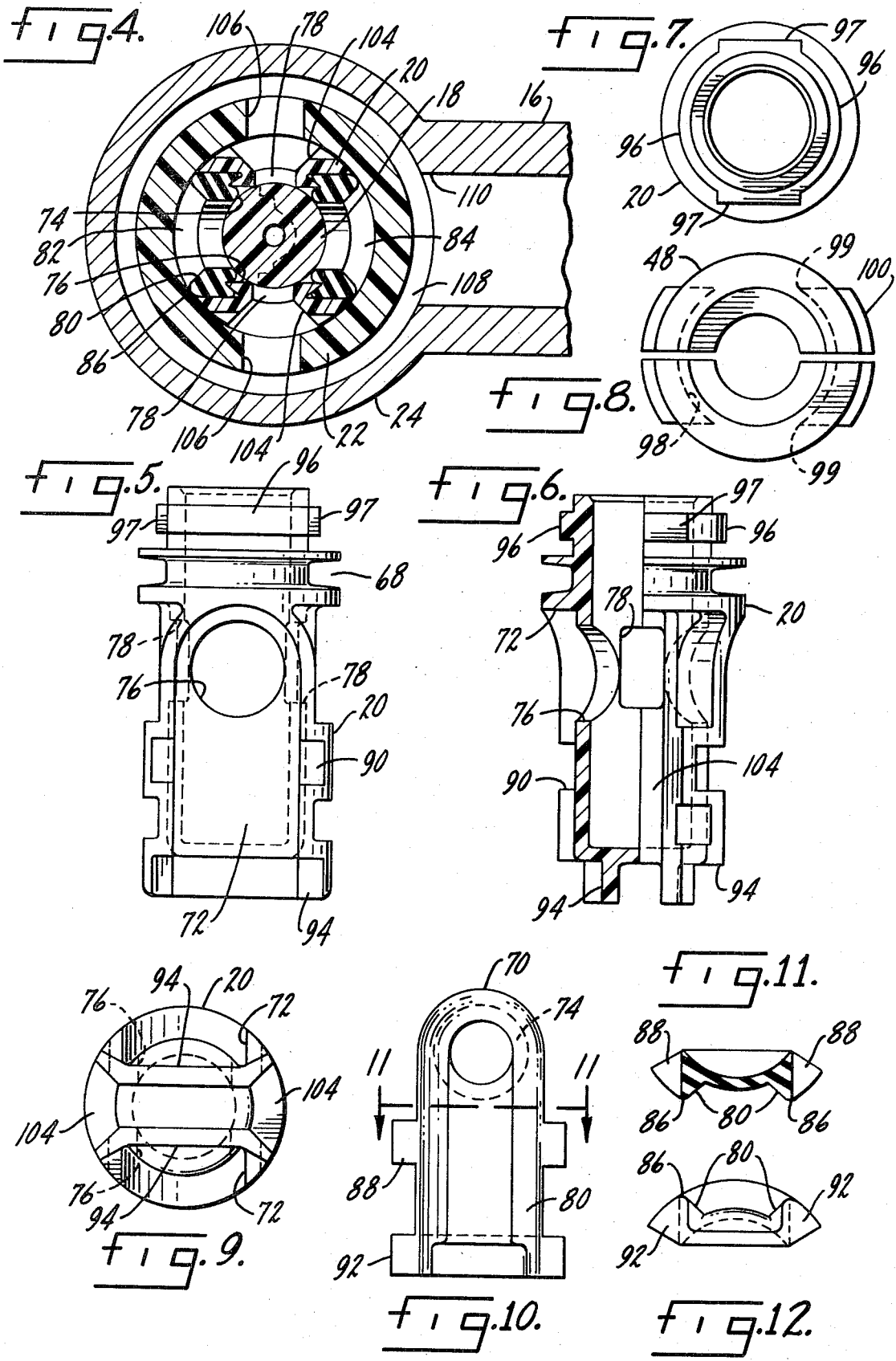

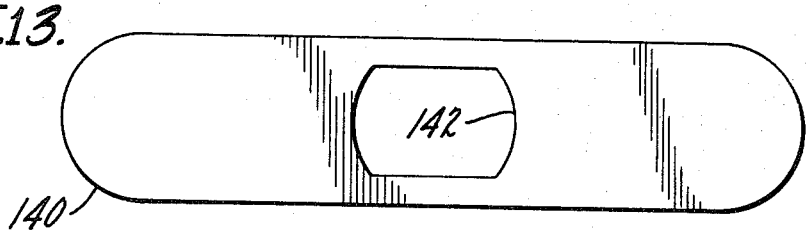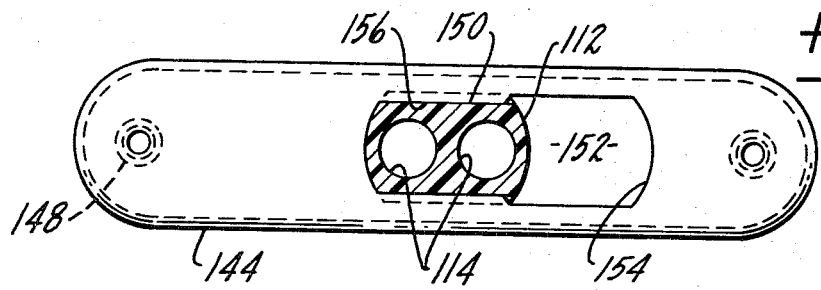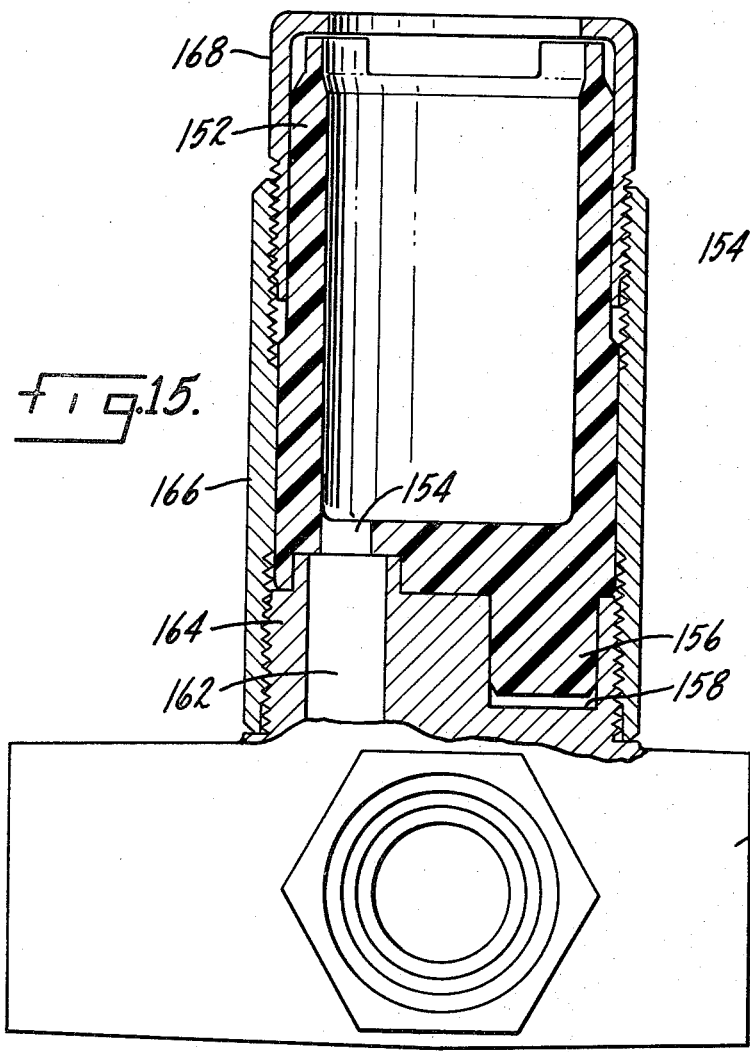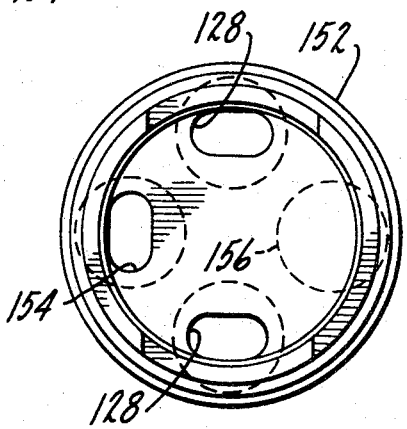

3,782,417

FAUCET CONSTRUCTION

SUMMARY OF THE INVENTION

The present invention relates to improvements in single lever mixing faucets of the type shown in my copending application Ser. No. 147,327, filed May 27, 1971 now U.S. Pat. No. 3,726,316. The present application is a continuation-in-part of said application.

A primary purpose of the present invention is a single lever mixing faucet of the type described in which the valve stem is balanced in any given position by means of an air vent extending through the stem and connecting the interior space between the stem and the sleeve with atmosphere.

Another purpose is a mixing faucet construction utilizing an improved seal means to provide sealing contact with the movable members of the faucet.

Another purpose is a faucet construction utilizing an improved means for mounting the faucet to a sink or the like.

Another purpose is a faucet construction of the type described in which the faucet is mounted on a body member with the body member supporting the receiver portion of the faucet and the body member and receiver interlocking and connecting the conduits to the faucet.

Another purpose is a mixing faucet construction utilizing a seal which is interlocked with the exterior to the valve sleeve.

Another purpose is a simply constructed reliably operable mixing faucet in which the movable stem is pressure-balanced at all positions.

Another purpose is a mixing faucet construction of the type described including means for mounting the faucet in a shower-tub combination.

Other purposes will appear in the ensuing specification, drawings and claims.

BRIEF DESCRIPTION OF THE DRAWINGS

The invention is illustrated diagrammatically in the following drawings wherein:

FIG. 1 is a side elevation, partially in axial section, of a mixing faucet of the type described, FIG. 2 is a side view of the valve stem, FIG. 3 is a section along plane 3—3 of FIG. 2, FIG. 4 is a section along plane 4—4 of FIG. 1, FIG. 5 is a side view of the valve sleeve with the seal removed, FIG. 6 is a side view in partial section of the valve sleeve with the seal removed, rotated 90 degrees from the view of FIG. 5, FIG. 7 is a top plan view of the valve sleeve, FIG. 8 is a bottom view of the sleeve extension, FIG. 9 is a bottom view of the valve sleeve, FIG. 10 is a side elevation of one of the seal members, FIG. 11 is a section along plane 11—11 of FIG. 9, FIG. 12 is a bottom view of one of the seal members, FIG. 13 is a plan view of a mounting plate, FIG. 14 is a plan view of a mounting bar, FIG. 15 is a side elevation, in part section, showing a means for mounting the faucet in a shower-tub combination, and FIG. 16 is a top view of the receiver used in FIG. 15.

DESCRIPTION OF THE PREFERRED EMBODIMENT

In FIG. 1 a faucet is indicated generally at 10 and a decorative escutcheon or cover is indicated at 12. The faucet has a movable lever 14 and a spout 16. The valve as shown is adapted for a sink installation. The sink top will normally be positioned directly beneath the escutcheon or cover 12.

The faucet valve includes a stem 18 and a sleeve 20. The stem is indicated in FIG. 2 and the sleeve in FIGS. 5, 6, 7 and 8. The stem is positioned within and rotatable and reciprocal relative to the sleeve to control the volume and temperature of water passing through the faucet to the spout 16. The combination of the stem and sleeve is positioned within a receiver 22 which in turn is mounted within an outer decorative housing 24 with the spout 16 forming a portion of the housing 24. The exterior of the receiver 22 may have outwardly facing grooves 26 and 28 mounting seal rings 30 and 32 which are in sealing contact with the interior of the housing 24.

A cap 34 is attached by a screw or the like 36 to the top of the stem 18. The cam may be formed by an upper section 38 and a lower section 40 which interlock together and hold the lever 14 within the cap. The lever 14 has a circular portion 42 which is positioned inside of the cap 34 and has an inwardly extending projection 44 which is positioned within a groove 46 of a circular extension 48 which is attached to the top of the sleeve 20.

The stem 18 has a lower annular groove 50 mounting a seal ring 52 and an intermediate annular groove 54 mounting a seal ring 56. Both seal rings 52 and 56 are in sealing contact with the interior of the sleeve. The stem 18 has a notch 58 and a silencing screen 60 positioned within the notch. The notch 58 forms the passage means for interconnecting the sleeve hot and cold inlets with the sleeve discharge for regulating water flow through the faucet. A vent passage or air passage 62 extends axially through the sleeve 18 and is in communication with an upper bore 64 which is threaded to receive the screw 36. A radially extending passage 66, above seal 56, is in communication with the vent passage 62 to connect the space beneath the stem 18 to atmosphere. Thus, the stem can be moved relative to the sleeve without any restrictions caused either by vacuum or pressure buildup beneath the stem and in the space between the stem and the sleeve. Since both the bottom of the stem and the top of the stem are at atmospheric pressure, and the water receiving areas of the stem are equal and opposite, the stem is pressure-balanced at any given position and there will be no movement caused by water pressure alone. The stem must be manually moved to change its position relative to the sleeve.

The sleeve 20 has an upper annular groove 68 mounting a seal ring 69 which is in sealing contact with the interior of the receiver 22. The sleeve 20 is hollow to receive the stem 18 and a pair of seal members indicated at 70 in FIG. 9 fit within mating recesses 72 on opposite portions of the sleeve. Each of the seal members 70 have an inwardly-directed stem sealing portion or port sealing portion 74 which portions pass through ports 76 in the hollow sleeve so as to have the interior rim thereof in sealing contact with the stem. The sleeve has a pair of inlet ports 76 and a pair of water discharge ports 78. The seal members 70 have outwardly-flared side areas 80 which cooperate with the interior surface of the receiver 22 to form water passages 82 and 84, as shown in FIG. 1, to connect the receiver inlets, to be described hereinafter, with the ports 76. The outer edges or outer rims 86, adjacent the outwardly-slanted surfaces 80 are in sealing contact with the interior of the receiver to define the water passages 82 and 84 and to prevent cross flow or water between the hot and cold water inlets. The seal members 70 are in sealing contact with the stem, the exterior of the sleeve and the interior of the receiver.

The individual seal members 70 are interlocked with the exterior of the sleeve to prevent movement due to water pressure within the faucet. Each of the seal members 70 have outwardly-extending projections 88 which are positioned within mating grooves 90 on the exterior of the sleeve. At the bottom of the seal members 70 there are similar outwardly-extending projections which also functions as feet, such feet or projections being indicated at 92. The feet 92 will seat upon the bottom of the receiver 22 and will have portions thereof interlocked within grooves 94 positioned at the bottom of the sleeve 20.

The two seal members 70 are thus positioned on generally opposite sides of the sleeve 20, have portions in sealing contact with the stem, sleeve and receiver and cooperate with the interior surface of the receiver to define the water passages communicating with the sleeve inlet ports 76.

The sleeve 20 is fixed within the receiver by means of the annular member 48. There are outwardly-directed flanges 96 adjacent the top of the sleeve and the flanges are positioned within mating grooves 98 formed on the interior of the annular member 48. To provide radial alignment lugs 97 extend outwardly from the sleeve 20 intermediate the flanges 96, with the lugs being received in openings 99 in the member 48. In practice, the annular member 48 may be formed in two identical halves, although this is not necessary. The annular member 48 in turn has outwardly-directed flanges 100 which seat in cutouts 101 on top of the upper end of the receiver 22. Thus, the annular member 48 is fixed to the sleeve and in turn seats on top of the receiver 22. A nut 102 is in threaded engagement with the upper end of the receiver 22 and has an inwardly-directed portion which overlies the flanges 100 to thus secure the entire assembly within the retainer.

Of advantage in the invention is the fact that the stem, sleeve and retainer all may be formed of a non-metallic material, such as one of the various suitable plastics. The cap 34 and the lever 14 may also be formed of plastic in some applications. The outer casting 24 preferably is metallic so as to provide a decorative effect for to the faucet, although in some applications it also may be formed of plastic with a suitable metallic outer plating.

The sleeve 20, as indicated, has discharge ports 78. The discharge ports 78 are in communication with axially-extending grooves 104 on the exterior of the sleeve which are spaced 90 degrees from the recesses 72 which position and receive the seal members 70. Thus, the seal members 70 not only define the water inlet passages, but serve to seal the inlets from the discharge passages 104 on the exterior of the sleeve.

The receiver 22 has a pair of discharge ports 106 which are in alignment with the discharge passages 104 in the exterior of the sleeve. Note particularly FIG. 4. The discharge passages 106 in the receiver in turn will direct the outwardly flowing water to the space 108 about the exterior of the retainer and inside of the housing 24. A port 110 connects the space 108 with the spout 16 to direct the outwardly flowing water to the spout. Water coming in through passages 82 and 84 flows through the ports 76 and the port seal portions of the seal member 70 and through the notch 58 in the stem. The position of the notch relative to the sleeve determines the volume and temperature of water that is directed to the discharge ports 78. From ports 78 the water will flow along the exterior of the sleeve in passages 104 to the ports 106 in the receiver. From the receiver ports 106 the water flows through space 108 and then out through port 110 to the spout 16.

The receiver 22 of FIG. 1 is mounted upon a body member 112 which has a pair of passages 114, one for hot water and one for cold water. Positioned within the passages 114 are conduits or pipes 116. Adjacent the upper end of each of the conduits 116 are outwardly-directed flanges 118, which may be formed by a swaging operation or the like. The flanges 118 seat upon an upper shoulder 120 in the body member 112 and are positioned directly below the lower surface 122 of the receiver 22. The conduits 116 extend upwardly into openings 124 in the bottom of the receiver 22 and seals 126 are effective to prevent water from leaking out at this point. The water flowing from the conduits 116 flows upwardly through ports 128 in the bottom of the receiver which are in alignment with the openings 124.

The body member and receiver are secured together by means of a nut or the like 130. The nut has an inwardly-directed flange 132 which overlies an outwardly-directed shoulder 134 on the exterior of the receiver. Shoulder 134 seats upon the upper end of the body member and is held in position by the nut 130. Thus, the entire assembly is attached together on top of the cover 12.

The body member 112 has flatted sides and fits within a correspondingly-shaped opening in a base 111 positioned beneath the cover 12. The sink top, not shown, may have a conventional round opening, although this is not necessary. Positioned directly beneath the bottom of the sink top is a plate 140, illustrated in FIG. 13, and having what is known as a double D opening which matches the cross section of the body member 112. The opening is indicated at 142. A mounting bar 144 is positioned below plate 140 and is illustrated in FIG. 14. The mounting bar may have a pair of wing screws, one of which is indicated at 146, which are threaded into bosses 148 at the opposite ends of the mounting bar. As the screws 146 are turned, they will force the plate 140 upwardly against the bottom of the sink. On each side of the exterior surface of the body member 112 are a pair of spaced grooves 150. Note that the opening 152 in the mounting bar 144 has a large area 154 and a smaller area 156. The larger area 154 corresponds to the opening 142 in the plate 140. In application the body member 112 initially passes through the opening 154. After the mounting bar is appropriately placed relative to one of the grooves 150, and this will depend upon the thickness of the sink bottom, then the mounting bar 144 is moved to the right so that the sides of the opening 156 will be positioned within the grooves 150 to lock the mounting bar to the body member. Then the wing screws 146 are turned to move the plate 140 rigidly upwardly against the bottom of the sink.

FIGS. 15 and 16 show a modification of the invention suitable for use in a shower-tub combination. The receiver is indicated at 152 and will be suitable to receive the same faucet valve described above. The bottom of the receiver 152 has the openings 128 for the hot and cold water inlets. It also has a further opening 154 which functions as a discharge. A pin 156 extends downwardly from the bottom of the retainer and seats in a socket 158 near the upper end of the body member 160 which supports the receiver. A discharge passage 162 in the body member 160 is in alignment with opening 154 to thus direct the water discharge into the body member. A conventional diverter arrangement may be used to convey the water from the valve to either a shower or a tub.

The exterior of the body member 160 may have a threaded area 164 which threadedly mounts a sleeve 166. The upper end of the sleeve 166 is in threaded engagement with a nut 168 which functions in the same manner as nut 102 shown in FIG. 1, and is effective to hold the valve consisting of the stem and the sleeve within the retainer. Thus, the nut 168 is threadedly engaged with sleeve 166, which in turn is threadedly engaged with the body member to hold the receiver and valve in position.

Of importance in the invention is the fact that many of the components may be formed of plastic. The cap, lever, stem, sleeve, receiver, and in some instances the housing 24, all may be formed of a suitable non-metallic material.

Also of importance is the fact that the pressure balance of the stem is provided by means of an air passage extending completely through the stem and connecting the space between the lower end of the stem and the sleeve with atmosphere.

The body member 112 which also may be formed of plastic has passages for the conduits 116 and the upper end of the conduits are interlocked by means of the swaged flanges 118 to both the receiver and the body member to thus secure the entire assembly together as a unitary construction.

Whereas the preferred form of the invention has been shown and described herein, it should be realized that there may be many modifications, substitutions and alterations thereto.

I claim:

1. In a single handle mixing faucet, a stem, inlet and outlet means in said stem, a sleeve having hot and cold water inlet openings and at least one water discharge opening, said stem being positioned within and rotatable and reciprocal relative to said sleeve to control the volume and temperature of water flowing from said inlet openings to the discharge opening, seal means between said stem and sleeve, a receiver for holding said stem and sleeve, hot and cold water inlet openings in said receiver, passage means between the exterior of said sleeve and interior of the receiver in alignment with the receiver hot and cold water inlet openings for connecting the receiver and sleeve inlet openings, said passage means including seal means positioned between the exterior of said sleeve and the interior of said receiver, and discharge means in said receiver, air passage means in said stem connecting the space between the bottom of the stem and the sleeve with atmosphere.

2. The structure of claim 1 further characterized in that said stem and sleeve each have closed bottoms to define a space between the bottom of the stem and the bottom of the sleeve.

3. The structure of claim 2 further characterized in that said air passage means has an axially extending portion within said stem and a radially extending portion spaced from the closed bottom of the stem.

4. The structure of claim 3 further characterized in that said radially extending passage portion is positioned outwardly of the seal means between the stem and the sleeve.

5. The structure of claim 1 further characterized in that the stem and sleeve are formed of a non-metallic material.

6. The structure of claim 1 further characterized in that said seal means associated with the passage means includes a plurality of seal members positioned about said sleeve and having portions in sealing contact with said stem, sleeve and receiver.

7. The structure of claim 6 further characterized in that said seal members, in cooperation with the interior of the receiver, define the passage means between the receiver hot and cold water inlet openings and the sleeve inlet openings.

8. The structure of claim 7 further characterized by and including means for interlocking each of said seal members with the sleeve.

9. The structure of claim 8 further characterized in that said interlocking means includes circumferentially extending projections on said seal members and mating recesses on the exterior of the sleeve.

10. The structure of claim 7 further characterized in that said seal members include portions seated upon the bottom of the receiver.

11. The structure of claim 10 further characterized by and including means associated with the seal portions seated upon the bottom of the receiver for interlocking the seal members with the sleeve.

12. In a single handle mixing faucet, a stem, inlet and outlet means in said stem, a sleeve having hot and cold water inlet openings and at least one water discharge opening, said stem being positioned within and rotatable and reciprocal relative to said sleeve to control the volume and temperature of water flowing from said inlet openings to the discharge opening, seal means between said stem and sleeve, a receiver for holding said stem and sleeve, hot and cold water inlet openings in said receiver, passage means between the exterior of said sleeve and interior of the receiver in alignment with the receiver hot and cold water inlet openings for connecting the receiver and sleeve inlet openings, discharge means in said receiver, said passage means including seal means, said seal means including a plurality of seal members positioned about said sleeve, said seal members having portions in sealing contact with said stem, sleeve and receiver, and means for interlocking said seal members with the sleeve.

13. The structure of claim 12 further characterized in that the means for interlocking the seal members with the sleeve include circumferentially extending projections on the seal members and mating recesses on the exterior of the sleeve.

14. The structure of claim 13 further characterized in that said receiver stem and sleeve are made of a non-metallic material.

15. In a single handle mixing faucet, a stem, inlet and outlet means in said stem, a sleeve having hot and cold water inlet openings and at least one water discharge opening, said stem being positioned within and rotatable and reciprocal relative to said sleeve to control the volume and temperature of water flowing from said inlet openings to the discharge opening, seal means between said stem and sleeve, a receiver for holding said stem and sleeve, hot and cold water inlet openings adjacent one end of said receiver, passage means between the exterior of said sleeve and the interior of the receiver in alignment with the receiver hot and cold water inlet openings for connecting the receiver and sleeve inlet openings, said passage means including seal means, discharge means in said receiver, and means for supporting said receiver including a body member positioned beneath said receiver, conduit means in said body member in communication with said receiver inlet openings, means for securing said receiver to said body member and means for interlocking said conduit means with said receiver and body member including outwardly extending flanges adjacent one end of said conduit means, said flanges being positioned between adjacent surfaces of said receiver and body member.

16. The structure of claim 15 further characterized in that the means for securing said receiver to the body member include a member threadedly engaged with a portion of the body member and overlying a portion of the receiver.

17. The structure of claim 16 further characterized by and including an outwardly extending flange on the exterior of said receiver, said flange being seated upon said body member, with said threaded member having a portion overlying said flange for securing the receiver to the body member.

18. The structure of claim 15 further characterized by and including seal means between flanges on the conduit means and the receiver.

19. The structure of claim 15 further characterized in that said stem, sleeve, retainer and body member are all formed of a non-metallic material.

20. The structure of claim 15 further characterized by and including means for securing said body member to a sink including a plate adapted to be positioned against the bottom of the sink, an opening in said plate, with said body member extending through said opening, and means attached to said body member for exerting an upwardly-directed pressure against said plate to hold the body member to the sink.

21. The structure of claim 20 further characterized in that the means for exerting an upwardly-directed pressure on the plate include a mounting bar having an opening, said body member extending through said opening, and means on the mounting bar for exerting an upwardly-directed pressure on said plate.

22. The structure of claim 21 further characterized in that said mounting bar has portions adjacent its opening arranged to interlock with mating portions on the body member for securing the mounting bar to the body member.

23. The structure of claim 22 further characterized by and including at least one groove on the exterior of said body member positioned to receive a mating portion on the mounting bar.

24. In a single handle mixing faucet, a stem, inlet and outlet means in said stem, a sleeve having hot and cold water inlet openings and at least one water discharge opening, said stem being positioned within and rotatable and reciprocal relative to said sleeve to control the volume and temperature of water flowing from said inlet openings to the discharge opening, seal means between said stem and sleeve, a receiver for holding said stem and sleeve, hot and cold water inlet openings adjacent one end of said receiver, passage means between the exterior of said sleeve and the interior of the receiver in alignment with the receiver hot and cold water inlet openings for connecting the receiver and sleeve inlet openings, said passage means including seal means, a discharge opening in the bottom of said receiver adjacent said receiver inlet openings, and means for supporting said receiver including a body member positioned beneath said receiver, and means for securing said receiver to said body member including a cup-shaped member having a portion positioned to interlock with said receiver, a sleeve threadedly engaged with said cup-shaped member and threadedly engaged with said body member.

25. The structure of claim 24 further characterized in that said sleeve threaded sections are spaced at opposite ends of the sleeve.

* * * * *